United States Patent Office 3,467,704
Patented Sept. 16, 1969

3,467,704
LINEAR PHOSPHONITRILES
Edward F. Moran, Wenonah, and Donald P. Reider, Woodbury, N.J., assignors to E. I. du Pont de Nemours and Company, Wilmington, Del., a corporation of Delaware
No Drawing. Filed Aug. 24, 1966, Ser. No. 574,549
Int. Cl. C08g *33/16*
U.S. Cl. 260—551    10 Claims The present invention relates to novel phosphorus-nitrogen compounds and processes for their preparation. More particularly, the invention relates to linear organic substituted phosphonitriles represented by the formula:

$$R[P(R^1)(R^2)=N]_nP(R^3)(R^4)XCl$$

wherein the R's represent monocyclic aryl radicals, X is an amino radical when $n$ equals 1 or 2 or a monocyclic aryl radical when $n$ equals 2, phosphonitrilic compounds of increased chain length and phosphonitrilic phosphine oxides represented by the formula:

$$(R)(R^1)(R^2)P=NP(O)(R^3)(R^4)$$

wherein the R's have the designation given above, and processes for their preparation.

In recent years, considerable attention has been focused on the so-called "inorganic polymers" and in particular, on phosphonitrilic chlorides and related compounds. Whereas efforts to prepare cyclic phosphonitriles have enjoyed some measure of success (U.S. 3,260,685, 3,230,-252; British 1,023,415, 1,017,375, 1,013,462), the efforts to prepare the linear analogs have met with little success. Only very short chain linear phosphonitriles and related compounds have been prepared and most often, by methods which have serious drawbacks from, for example, an economic or safety standpoint. Triarylphosphinimide chlorides, intermediates in the above process, have been prepared by the reaction of a triarylphosphine with chloramine, as described in the Journal of the American Chemical Society, vol. 81, page 2983 (1959) and Particle, vol. 3, page 25 (1960). However, the use of chloramine as a reactant in the process is disadvantageous because, among other things, it must be generated separately and it is both unstable and somewhat treacherous. As described in Particle, the reaction of chlorine and ammonia to form chloramine is highly exothermic, producing flames and temperatures of about 600° C.

Furthermore, in the preparation from phosphine oxides, the art describes methods wherein sodium azide must be used in processes for making phosphonitrilic oxides, one such method is described in the Journal of the American Chemical Society, vol. 83, page 4466 (1961). The use of azides presents a serious safety problem due to the fact that they are both explosive and poisonous. The method of the present invention avoids the use of azides and thus provides a safer and more economical method for obtaining phosphonitrilic phosphine oxides.

It has now been discovered that novel long chain linear phosphonitriles of the formula $$R[P(R^1)(R^2)=N]_nP(R^3)(R^4)XCl$$

wherein the R's represent monocyclic aryl radicals and when $n$ equals 1 or 2, X is an amino radical or when $n$ equals 2, X is a monocyclic aryl radical, can be easily and safely prepared by a process which comprises:

(a) chlorinating a trisubstituted phosphine having the formula $(R)(R^1)(R^2)P$ wherein the R's represent monocyclic aryl radicals and subsequently ammoniating the chlorinated phosphine to produce a trisubstituted phosphinimide chloride of the formula $(R)(R^1)(R^2)PNH_2Cl$, (b) reacting said phosphinimide chloride with a phosphine selected from the group consisting of disubstituted trivalent or pentavalent chlorophosphines of the formula $(R^3)(R^4)PCl_m$ wherein the R's represent monocyclic aryl radicals and $m$ is 1 or 3 in presence of base, (c) ammoniating the resulting product to produce the linear phosphonitrile designated above, with the proviso that when $m$ equals 1 in the above formula the reaction product of step (b) is chlorinated prior to ammoniation.

Furthermore, the chain length of the monocyclic aryl substituted linear phosphonitrile of the formula $$(R)(R^1)(R^2)P=NP(R^3)(R^4)=NH_2Cl$$

prepared as described above can be increased by reacting it with a disubstituted trivalent or pentavalent chlorophosphine of the formula $(R^3)(R^4)PCl_m$, as designated above, where $m$ is 1 or 3 in the presence of base and ammoniating the resulting products to produce a higher molecular weight linear phosphonitrile of the formula $$(R)[P(R^1)(R^2)=N]_2P(R^3)(R^4)=NH_2Cl$$

wherein the R's represent monocyclic aryl radicals.

As stated above, phosphonitrilic phosphine oxides of the formula:

$$(R)(R^1)(R^2)P=NP(O)(R^3)(R^4)$$

wherein the R's are monocyclic aryl radicals can also be prepared. The process for their preparation involves carrying out the procedure described hereinabove in step (a) and step (b) with the proviso that if the phosphinimide chloride is reacted with a disubstituted trivalent chlorophosphine, the product be chlorinated and then hydrolyzing the resulting phosphonitrile compound having the structure $(R)(R^1)(R^2)P=NP(R^3)(R^4)(Cl)_2$. Upon hydrolysis oxygen replaces the chlorine atoms of the phosphonitrile and the corresponding phosphonitrilic phosphine oxide represented above is produced.

The novel linear monocyclic aryl substituted phosphonitriles of the present invention are thermally and hydrolytically stable compounds. As thermally stable (e.g., stable when heated up to about 400° C.) and hydrolytically stable (e.g. unchanged by contact with boiling water) materials, the compounds of the present invention are useful as heat transfer media, high temperature lubricants and hydraulic fluids. In addition, the linear phosphonitriles of the formula $(R)[P(R^1)(R^2)=N]_nP(R^3)(R^4)NH_2Cl$ where $n$ equals 1 or 2, are useful chemical intermediates in that each phosphonitrile may serve as the starting material for the reaction with a chlorophospine and subsequent ammoniation as described herein to produce the next higher homologue in the series.

The phosphonitrilic phosphine oxide as described above wherein the R's are phenyl radicals has been characterized in Journal of Organic Chemistry, vol. 30, p. 3861 (1965) as a compound stable to hydrolysis by various agents and thermally stable after 16 hours at 250° C. and then 5 hours at 280° C. in an evacuated, sealed tube. It has also been discovered in the present invention that the said oxide is stable at higher temperatures, i.e., the oxide is recovered unchanged after 16 hours at 310° C. in an evacuated, sealed tube. The phosphine oxides are useful in high temperature applications as described above.

In a preferred embodiment of the invention for the preparation of $(C_6H_5)[P(C_6H_5)_2=N]_nP(C_6H_5)_2XCl$ where when $n$ equals 1, X is an amino radical and when $n$ equals 2, X is a phenyl radical, chlorine gas is passed into a solution of triphenylphosphine in an inert solvent, such as chloroform, to produce triphenylchlorophosphine. This reaction can be conducted at temperatures of from about −20° C. to 50° C. Preferably, the reaction is carried out in an ice bath at temperatures ranging from about −10° to 5° C. Chlorine gas is passed into the solution, usually until the colorless solution turns sharply to a dark yellow color due to excess chlorine gas. The color change is indicative of complete formation of triphenyl dichlorophosphine. Preferably, anhydrous ammonia is passed into the chlorophosphine solution until the yellow color disappears and a heavy white precipitate forms. This reaction is exothermic and, therefore, generally no external heating is required. The temperature usually varies from about 0 to 65° C. Upon addition of at least a slight excess of ammonia, the reaction is complete, and generally there is a drop in temperature.

The triphenylphosphinimide chloride is subsequently reacted with either a trivalent or pentavalent disubstituted chlorophosphine represented by the formula $$(R^3)(R^4)PCl_m$$

wherein the R's are monocyclic aryls, e.g., phenyl and substituted phenyl and $m$ equals 1 or 3, e.g. $(C_6H_5)_2PCl_3$, in the presence of base, preferably a Lewis-type base, e.g. triethylamine. As used herein, a Lewis base is defined as a compound capable of giving up to an acid an unshared pair of electrons. While the present invention is not intended to be limited by theory, it is believed that the Lewis base, e.g. triethylamine, acts as an HCl acceptor (i.e. HCl is split off in the reaction:

$$(R)(R^1)(R^2)PNH_2Cl+(R^3)(R^4)PCl_3+2Et_3N \rightarrow$$
$$(R)(R^1)(R^2)P=NP(R^3)(R^4)Cl_2+2Et_3N \cdot HCl)$$

and forms a salt, e.g. an amine salt such as $Et_3N \cdot HCl$. Examples of suitable Lewis bases that can be used in the present invention are tertiary amines, e.g., trimethylamine, triethylamine, tributylamine, and pyridine. In view of the fact that chlorophosphines are easily hydrolyzed to the corresponding acids, it is desirable to conduct the reaction under anhydrous conditions. When this reaction is conducted with a pentavalent trichlorophosphine the resulting product is $[(R)(R^1)(R^2)P=NP(R^3)(R^4)(Cl)_2]$, the R's being monocyclic aryl radicals, e.g., phenyl and substituted phenyl. The resulting chlorine-containing phosphonitrile is ammoniated with anhydrous ammonia to produce the corresponding linear monocyclic aryl substituted phosphonitrile. In a similar fashion, but, when the reaction is carried out with a trivalent chlorophosphine, e.g. $(C_6H_5)_2PCl$, the resulting phosphonitrile does not contain chlorine and has the formula:

$$[(R)(R^1)(R^2)P=NP(R^3)(R^4)]$$

wherein the R's represent monocyclic aryl radicals, e.g., phenyl or substituted phenyl radicals. Therefore, it is necessary to first chlorinate the intermediate prior to ammoniation, so that the compound reacted with ammonia has the formula $$[R(R^1)(R^2)P=NP(R^3)(R^4)(Cl)_2]$$

e.g.

$$(C_6H_5)_3P=NP(C_6H_5)_2(Cl)_2.$$

The ammoniation of the mixture as described above results in the formation of linear phosphonitriles having the formula $$R[(R^1)(R^2)P=N]_nP(R^3)(R^4)XCl$$

wherein the R's represent monocyclic aryl radicals, and when $n$ equals 1 or 2, X is amino radical and when $n$ equals 2, X is a monocyclic aryl radical. Monocyclic aryl radicals are, for example, phenyl and substituted phenyl radicals of the formula $(C_6H_{5-n})Y_n$ where Y represents, for example, an alkyl of from 1 to 6 carbon atoms, such as methyl, propyl, hexyl; alkoxy of from 1 to 6 carbon atoms such as methoxy, propoxy, hexoxy; perfluoroalkyl having 1 to 4 carbon atoms in the alkyl group such as perfluoromethyl, perfluorobutyl; perfluoroalkoxy having 1 to 4 carbon atoms in the alkoxy group such as perfluoromethoxy, perfluorobutoxy; fluoro; nitro; cyano and $n$ has a value of from 1 to 5.

In the reaction of a trisubstituted phosphine with a chlorinating agent, at least one mole of chlorine is required for each mole of said phosphine. A slight excess of chlorine is usually employed to insure complete formation of the chlorophosphine. The formation of a dark yellow color in the reaction vessel indicates excess chlorine has been added and that the reaction is completed. At least two moles of ammoniating agent are required for each mole of chlorophosphine, and generally, a slight excess of ammonia is employed. In this reaction, ammonium chloride is also produced in equal amounts with the desired phosphinimide chloride and the formation of a heavy white precipitate, viz. ammonium chloride, is indicative of a complete reaction.

The reaction of a phosphinimide chloride with either a disubstituted trivalent or pentavalent chlorophosphine requires only about equimolar amounts of reactants. However, an excess of about one to two moles of the phosphinimide chloride can be used. For example, in the preparation of $(C_6H_5)_3P=NP(C_6H_5)_2=NP(C_6H_5)_3Cl$, the use of excess, e.g. about one mole, of the phosphinimide chloride, gives somewhat higher yields. A large excess, e.g., more than about 2 moles, of the phosphinimide chloride does not provide any additional advantage. The amount of the ammoniating agent employed that is reacted with the solution of the chlorine-containing phosphonitrilic intermediate to produce the desired linear chlorine-containing phosphonitriles ranges from at least two moles of ammonia per mole of intermediate to a reasonable excess of ammonia. The reaction is carried out in the presence of a Lewis base as described above. The amount of the base, e.g. triethylamine, employed can be from about at least 2 moles to about 6 moles. It appears that the amount of base used in the reaction determines the specific final product. For example, the use of excess triethylamine in amounts of 4 or more moles results in the completely monocyclic aryl substituted phosphonitrile, $(C_6H_5)_3P=NP(C_6H_5)_2=NP(C_6H_5)_3Cl$ as the major product and minor amounts of $$(C_6H_5)_3P=NP(C_6H_5)_2=NH_2Cl$$

whereas on the other hand, the use of less than 4 moles, e.g. about 2 moles, results in the formation of $$(C_6H_5)_3P=NP(C_6H_5)_2=NH_2Cl$$

as the major product.

The reaction of the trisubstituted phosphinimide chloride with the disubstituted trivalent or pentavalent chlorophosphine is preferably carried out in an inert organic solvent. The mixture of the reactants in such a solvent is refluxed, at temperatures of about 40° to 120° C., preferably about 60° to 100° C., for periods of at least 15 minutes up to 3 or 4 hours, preferably about 1 to 2 hours. After cooling to about 10 to 15° C., the solution is chlorinated if a disubstituted trivalent chlorophosphine is the initial reactant, and then ammoniated by treating with ammonia, heated rapidly to reflux for several minutes, and then cooled to recover the products.

In place of ammoniation as described above, the phosphonitrilic intermediate, $(C_6H_5)_3P=NP(C_6H_5)_2(Cl)_2$ may be subjected to hydrolysis to form the corresponding phosphonitrilic phosphine oxide, $$(C_6H_5)_3P=NP(=O)(C_6H_5)_2$$

as previously stated. The hydrolysis may be carried out using any known conventional methods which will add at least one mole of water for each mole of the intermediate, $(C_6H_5)_3P=NP(C_6H_5)_2Cl_2$ present, for example, simple evaporation of the compound from the reaction solvent over a steam bath may suffice for small scale preparations. Likewise, the direct addition of water or a water-organic solvent mixture, e.g. water-dioxane, to a solution of the intermediate and subsequent evaporation yields the phosphonitrilic phosphine oxide.

The reactions described above are generally, but not necessarily, carried out in the presence of an inert organic solvent which acts as the reaction medium. Any inert organic solvent may be used in the process, for example, non-polar hydrocarbons or halogenated hydrocarbons which are chemically inert to the reactants, such as 6 to 12 carbon atom alkanes, 1 to 10 carbon atom halogenated alkanes, 1 to 6 carbon atom nitriles and aromatic halogenated hydrocarbons such as mono-, di- and trihalogenated benzenes. Specific examples of inert organic solvents include straight and branched chain isomers of hexane, octane and decane, chloroform, carbon tetrachloride, dichloroethane, tetrachloroethylene, tetrachloroethane, acetonitrile, propionitrile, chlorobenzene, o-dichlorobenzene and trichlorobenzenes. The amount of solvent used can vary considerably and, when used, the minimum amount is that which facilitates stirring.

The reaction product $(C_6H_5)_3P=NP(C_6H_5)_2=NH_2Cl$, made according to the procedure described above can be further treated to increase the chain length of the chlorine-containing phosphonitrile, namely, to prepare $$(C_6H_5)_3P=NP(C_6H_5)_2=NP(C_6H_5)_2=NH_2Cl$$

by repeating the steps involving treatment with the chlorophosphine and ammoniation. The reaction conditions required to produce the compound $$(C_6H_5)[P(C_6H_5)_2=N]_n-P(C_6H_5)_2=NH_2Cl$$

where $n$ equals 2 are substantially the same as those already described for the compound where $n$ equals 1. $(C_6H_5)_3P=NP(C_6H_5)_2=NH_2Cl$ is reacted in about equimolar amounts with a disubstituted trivalent or pentavalent chlorophosphine of the formula $(R^3)(R^4)PCl_m$ as previously described in the presence of base, e.g., at least two moles of a Lewis base, such as triethylamine and preferably, an inert solvent as previously described as the reaction medium. If the trivalent chlorophosphine is used, the resulting intermediate, e.g.

$$(C_6H_5)_3P=NP(C_6H_5)_2=NP(C_6H_5)_2$$

must be chlorinated, e.g. treated with at least one mole of chlorine to produce the corresponding pentavalent intermediate $(C_6H_5)_3P=NP(C_6H_5)_2=NP(C_6H_5)_2Cl_2$ which is subsequently ammoniated, e.g. treated with at least two moles of ammonia, as previously described.

The following examples illustrate the preparation of the novel compositions of this invention and processes for their preparation. However, the examples are intended to be illustrative only and are not to be construed as limiting the invention in any way. The parts mentioned in the examples are parts by weight unless otherwise specified.

EXAMPLE 1

Step 1

The chloroform used as the solvent in this step was washed three times with 92 parts of concentrated $H_2SO_4$ per 1500 parts of solvent and then washed thoroughly with water. Calcium hydride is added to the chloroform and the mixture stirred overnight. Chloroform is then distilled off and kept under a $N_2$ atmosphere.

In a 1000 ml. flask fitted with a condenser, 131 parts of $(C_6H_5)_3P$ is dissolved in 2978 parts of $CHCl_3$ by stirring under a stream of $N_2$. The flask is then immersed in an ice bath and chlorine gas is passed into the solution until the solution turns dark yellow and excess chlorine appears in the condenser. Nitrogen is used to drive off the excess chlorine and anhydrous ammonia is then passed into the solution at room temperature. The reaction is exothermic and the temperature reaches the boiling point of chloroform (about 61° C.). The addition of $NH_3$ is continued until the yellow color of the solution disappears and a heavy white precipitate forms. The solution is refluxed for 30 minutes, then hot filtered to remove $NH_4Cl$. 1416 parts of dry ether is added to the filtrate. On cooling, a crystalline precipitate forms which is filtered and washed with ether to give 149 parts (95% yield) of $(C_6H_5)_3PNH_2Cl$, M.P. 233–235° C. The infrared spectrum agrees with that reported in the literature.

*Analysis.*—Calcd. for $C_{18}H_{17}PNCl$: C, 68.90%; H, 5.42%; N, 4.46%; P, 9.89%; Cl, 11.32%. Found: C, 68.25% H, 5.53%; N, 4.60%; P, 9.78%; Cl. 10.31%.

Steps 2 and 3

Into a 1000 ml., three-necked flask with a thermometer well, is placed 82 parts of $(C_6H_5)_3PNH_2Cl$, made according to the procedure described above, and 76 parts of $(C_6H_5)_2PCl_3$. All weighings and transfers are done in a "Glove Bag" under nitrogen. Under a stream of nitrogen, about 1566 parts of the solvent acetonitrile is distilled into the flask from calcium hydride. The flask is then fitted with a mechanical stirrer, thermometer, reflux condenser, and a funnel containing 53 parts of $(C_2H_5)_3N$. The mixture is heated to reflux (about 84° C.) and the $(C_2H_5)_3N$ added rapidly. After refluxing for 30 minutes, the mixture is cooled to 15° C. and 9 parts of $NH_3$ is passed in through the joint previously used for the dropping funnel. When the addition of $NH_3$ is complete, HCl is passed through the mixture to insure that the hydrochloride of the product is formed. The reaction mixture is filtered to give 65 parts of solid which are then slurried in hot isopropanol to give 55 parts of solids identified as $NH_4Cl$ and, on evaporation of the solvent, 10 parts of $(C_2H_5)_3NHCl$. The filtrate from the original reaction is concentrated by evaporation on a steam bath to give a resinous solid material. Slurrying the solid in benzene produces crystals which are recrystallized twice from acetone to give 80 parts (60% yield) of $$(C_6H_5)_3P=NP(C_6H_5)_2=NH_2Cl$$

M.P. 245–247° C. The phosphorus NMR spectrum gives two peaks of equal intensity with chemical shifts at −21.6 and −19.6 p.p.m. The —P=N—P— band appears as a triplet at 1280–1320 cm.$^{-1}$ in the IR spectrum. The proton NMR gives a proton ratio determined to be 13/1 (theoretical 12.5/1).

*Analysis.*—Calcd. for $C_{30}H_{27}P_2N_2Cl$: C, 70.30%; H, 5.30%; N, 5.47%; P, 12.10%; Cl, 6.93%. Found: C, 69.93%; H, 5.30%; N, 5.35%; P, 12.07%; Cl. 6.55%.

EXAMPLE 2

The process described in Example 1 is repeated with the exception that in Step 2 a trivalent chlorophosphine is reacted with the phosphinimide chloride. Accordingly, the reaction is between 31 parts of $(C_6H_5)_3PNH_2Cl$ and 25 parts of $(C_6H_5)_2PCl$ in 800 parts of chloroform and in the presence of 20 parts of $(C_2H_5)_3N$. After refluxing the mixture for about 30 minutes, the mixture is cooled and contacted with chlorine gas under a stream of nitrogen until the solution turns yellow indicating excess chlorine is present. The excess chlorine is drawn off under vacuum and excess ammonia (about 5 parts) is added at room temperature. A solid identified as $NH_4Cl$ is filtered from the resulting solution in a closed system. After adding excess ether and allowing the filtrate to stand overnight, crystals separate out and 17 parts (30% yield) of $(C_6H_5)_3P=NP(C_6H_5)_2=NH_2Cl$ is recovered. The melting point, infrared and phosphorus NMR spectra are identical with those described in Example 1 and the elemental analysis is in agreement.

EXAMPLE 3

A solution of 31 parts of $(C_6H_5)_3PNH_2Cl$ made according to the procedure in Step 1 of Example 1, and 22 parts of $(C_6H_5)_2PCl_3$ in 300 parts of chloroform is refluxed under nitrogen for five minutes and then cooled in an ice bath. A cold solution of 20 parts of $(C_2H_5)_3N$ in 150 parts of $CHCl_3$ is added, followed by 800 parts of $CCl_4$. The $(C_2H_5)_3NHCl$ which forms is filtered in a closed system and found to be a quantitative yield. The filtrate is distilled off to yield a resinous substance. Upon addition of approximately equivalent amounts of acetonitrile and water, crystals separate out from the solution. Filtration, followed by recrystallization from small amounts of acetone gives 30 parts (63% yield) of $$(C_6H_5)_3P=NP(O)(C_6H_5)_2$$

M.P. 169–171° C. The phosphorus NMR spectrum shows two bands of equal intensity with chemical shifts at −13.6 and −15.4 p.p.m., showing the existence of two different phosphorus atoms in the molecule. IR spectrum exhibits the characteristic —P=N—P— band at 1290 cm.$^{-1}$.

*Analysis.*—Calcd. for $C_{30}H_{25}P_2NO$: C, 75.46%; H, 5.28%; N, 2.93%; P, 12.97%. Found: C, 75.41%; H, 5.31%; N, 2.96%; P, 12.79.

EXAMPLE 4

In a single-neck, 300 ml. flask, a solution of 54 parts of $(C_6H_5)_3P=NH_2Cl$, made according to the procedure described above, 50 parts of $(C_6H_5)_2PCl_3$, and 70 parts of $(C_2H_5)_3N$, in 783 parts of acetonitrile, is gradually heated to reflux temperature (about 82° C.) for 1 hr. while maintaining anhydrous conditions. On cooling to room temperature, $(C_2H_5)_3NHCl$ crystallizes out. After filtering and subsequent extraction with more acetonitrile, 47 parts of $(C_2H_5)_3NHCl$ is recovered. Excess $NH_3$ is then passed through the filtrate and the mixture refluxed again for a few minutes. On cooling in an ice bath, $NH_4Cl$ separates and 8.5 parts is recovered by filtration. The acetonitrile is then distilled off from the filtrate, leaving a resinous material. The resin is dissolved in hot benzene and on cooling, 21 parts (32% yield) of crystals separates out. Recrystallization from acetonitrile and ether gives the desired product, $$(C_6H_5)_3P=NP(C_6H_5)_2=NP(C_6H_5)_3Cl$$

M.P. 227° C., and minor amounts of $$(C_6H_5)_3P=NP(C_6H_5)_2=NH_2Cl$$

and the hydrolysis product of $(C_6H_5)_2PCl_3$, namely $(C_6H_5)_2POOH$. The —P=N—P— band appears at 1230 cm.$^{-1}$ and the phosphorus NMR exhibits two peaks at −14.6 and −7.6 p.p.m. in a 2/1 ratio.

*Analysis.*—Calcd. for $C_{42}H_{35}P_3N_2Cl$: C, 74.55%; H, 5.21%; P, 12.01%; N, 3.62%; Cl, 4.58%. Found: C, 72.24%; H, 5.41%; P. 11.78%; N, 3.61%; Cl, 4.31%.

EXAMPLE 5

The perchlorate salt of the product of Example 4 is prepared by mixing 6.6 parts of the chloride, $$(C_6H_5)_3P=NP(C_6H_5)_2=NP(C_6H_5)_3Cl$$

dissolved in ethanol with perchloric acid at room temperature. Crystals immediately separate and after recrystallization and drying, 5.7 parts (79% yield) of $$(C_6H_5)_3P=NP(C_6H_5)_2=NP(C_6H_5)_3ClO_4$$

M.P. 272–275° C. is recovered. The infrared and phosphorus NMR spectra are essentially identical to those of the chloride.

*Analysis.*—Calcd. for $C_{48}H_{40}P_3N_2O_4Cl$: C, 68.85%; H, 4.81%; P, 11.09%; N, 3.34%; Cl, 4.23%. Found: C, 68.80%; H, 4.76%; P, 11.61%; N, 3.32%; Cl. 3.98%.

EXAMPLE 6

The process of Example 1, Steps 2 and 3 is repeated with the exception that in Step 2, the product of Example 1 is reacted with a disubstituted pentavalent chlorophosphine. Accordingly, 42 parts of $$(C_6H_5)_3P=NP(C_6H_5)_2=NH_2Cl$$

27 parts of $(C_6H_5)_2PCl_3$, 1566 parts of acetonitrile, and 25 parts of $(C_2H_5)_3N$ are placed in the reaction flask as previously described. After refluxing for about 45 minutes, and cooling to about 15° C., 5 parts of $NH_3$ is added. Upon filtration, evaporation of the solvent and recrystallization, 31 parts (53% yield) of $$(C_6H_5)_3P=NP(C_6H_5)_2=NP(C_6H_5)_2=NH_2Cl$$

M.P. 214–216° C., is obtained. The infrared spectrum exhibits the —P=N—P— band at 1250–1300 cm.$^{-1}$ and the phosphorus NMR spectrum shows two peaks at −16.2 and −7.2 p.p.m. in a 2/1 ratio.

*Analysis.*—Calcd. for $C_{42}H_{37}P_3N_3Cl$: C, 70.83%; H, 5.23%; P, 13.04%; N, 5.90%; Cl, 4.97%. Found: C, 70.68%; H, 5.27%; P, 12.91%; N, 5.94%; Cl, 5.30%.

We claim:
1. A process for the preparation of a linear phosphonitrile which comprises:
  (a) chlorinating with chlorine gas a trisubstituted phosphine having the formula $(R)(R^1)(R^2)P$ wherein the R's represent a phenyl or substituted phenyl radical of the formula $(C_6H_{5-n})Y_n$ where Y represents alkyl of from 1 to 6 carbon atoms, alkoxy of from 1 to 6 carbon atoms, perfluoroalkyl having 1 to 4 carbon atoms, perfluoroalkoxy having 1 to 4 carbon atoms, fluoro, nitro, cyano and $n$ has a value of from 1 to 5, and subsequently ammoniating with ammonia the chlorinated phosphine to produce a trisubstituted phosphinimide chloride of the formula $R(R^1)(R^2)PNH_2Cl$,
  (b) reacting said phosphinimide chloride with a phosphine selected from the group consisting of a disubstituted trivalent and pentavalent chlorophosphine of the formula $(R^3)(R^4)PCl_m$ wherein the R's represent a phenyl or substituted phenyl radical of the formula $(C_6H_{5-n})Y_n$ where Y represents alkyl of from 1 to 6 carbon atoms, alkoxy of from 1 to 6 carbons atoms, perfluoroalkyl having 1 to 4 carbon atoms, fluoro, nitro, cyano and $n$ has a value of from 1 to 5, and $m$ equals 1 or 3, in the presence of a Lewis base,
  (c) ammoniating with ammonia the resulting products to produce a linear phosphonitrile of the formula

$$R[P(R^1)(R^2)=N]_nP(R^3)(R^4)XCl$$

wherein when $n$ equals 1 or 2, X is an amino radical and when $n$ equals 2, X is a phenyl or substituted phenyl radical of the formula $(C_6H_{5-n})Y_n$ where Y represents alkyl of from 1 to 6 carbon atoms, alkoxy of from 1 to 6 carbon atoms, perfluoroalkyl having 1 to 4 carbon atoms, perfluoroalkoxy having 1 to 4 carbon atoms, fluoro, nitro, cyano and $n$ has a value of from 1 to 5, with the proviso that when $m$ equals 1 in the above formula the reaction product of step (b) is chlorinated prior to ammoniation.
2. The process of claim 1 wherein the R's are phenyl.
3. The process of claim 1 with the additional step of reacting the resulting linear phosphonitrile of claim 1 of the formula $R[P(R^1)(R^2)=N]P(R^3)(R^4)=NH_2Cl$ sequentially with a disubstituted trivalent or pentavalent chlorophosphine of the formula $(R^3)(R^4)PCl_m$ wherein the R's represent a phenyl or substituted phenyl radical of the formula $(C_6H_{5-n})Y_n$ where Y represents alkyl of from 1 to 6 carbon atoms, alkoxy of from 1 to 6 carbon atoms, perfluoroalkyl having 1 to 4 carbon atoms, perfluoroalkoxy having 1 to 4 carbon atoms, fluoro, nitro, cyano and $n$ has a value of from 1 to 5, and $m$ equals 1 or 3, in the presence of a Lewis base, and then ammoniating with ammonia the resulting product to produce a higher molecular weight linear phosphonitrile with the proviso that when $m$ equals 1 in the above formula the reaction product is chlorinated prior to ammoniation.
4. The process of claim 3 wherein the R's are phenyl.
5. A process for the preparation of a linear phosphonitrilic oxide which comprises:
  (a) chlorinating with chlorine gas a trisubstituted phosphine having the formula $(R)(R^1)(R^2)P$ wherein the R's represent a phenyl or substituted phenyl radical of the formula $(C_6H_{5-n})Y_n$ where Y represents alkyl of from 1 to 6 carbon atoms, alkoxy of from 1 to 6 carbon atoms, perfluoroalkyl having 1 to 4 carbon atoms, perfluoroalkoxy having 1 to 4 carbon atoms, fluoro, nitro, cyano and $n$ has a value of from 1 to 5, and subsequently ammoniating with ammonia the chlorinated phosphine to produce a trisubstituted phosphinimide chloride of the formula R(R¹)(R²)PNH₂Cl, (b) reacting said phosphinimide chloride with a phosphine selected from the group consisting of a trivalent and pentavalent chlorophosphine of the formula (R³)(R⁴)PCl_m wherein the R's represent a phenyl or substituted phenyl radical of the formula $$(C_6H_{5-n})Y_n$$

where Y represents alkyl of from 1 to 6 carbon atoms, alkoxy of from 1 to 6 carbon atoms, perfluoroalkyl having 1 to 4 carbon atoms, perfluoroalkoxy having 1 to 4 carbon atoms, fluoro, nitro, cyano and n has a value of from 1 to 5, and m equals 1 or 3, in the presence of a Lewis base to produce a chlorine-containing linear phosphonitrile, and (c) hydrolyzing said chlorine-containing phosphonitrile to produce the corresponding linear phosphonitrilic oxide of the formula $$(R)(R^1)(R^2)P=NP(O)(R^3)(R^4)$$

with the proviso that when m equals 1 in the above formula the reaction product of step (b) is chlorinated prior to hydrolysis.

6. The process of claim 9 wherein the R's are phenyl.

7. The linear phosphonitrile having the formula $$R[P(R^1)(R^2)=N]_nP(R^3)(R^4)XCl$$

wherein R, R¹, R², R³ and R⁴ represent a phenyl or substituted phenyl radical, X is an amino radical of the formula $(C_6H_{5-n})Y_n$ where Y represents alkyl of from 1 to 6 carbon atoms, alkoxy of from 1 to 6 carbon atoms, perfluoroalkyl having 1 to 4 carbon atoms, perfluoroalkoxy having 1 to 4 carbon atoms, fluoro, nitro, cyano and n has a value of from 1 to 5, when n is 1 or 2, or X is a phenyl or substituted phenyl radical of the formula $(C_6H_{5-n})Y_n$ where Y represents alkyl of from 1 to 6 carbon atoms, alkoxy of from 1 to 6 carbon atoms, perfluoroalkyl having 1 to 4 carbon atoms, perfluoroalkoxy having 1 to 4 carbon atoms, fluoro, nitro, cyano and n has a value of from 1 to 5, when n is 2.

8. The linear phosphontrile $$(C_6H_5)_3P=NP(C_6H_5)_2=NH_2Cl$$

9. The linear phosphonitrile $$(C_6H_5)_3P=NP(C_6H_5)_2=NP(C_6H_5)_3Cl$$

10. The linear phosphonitrile $$(C_6H_5)_2P=NP(C_6H_5)_3=NP(C_6H_5)_2=NH_2Cl$$

References Cited

Appel et al., Zeitschrift fur Anorg. und Allg. Chemie, vol. 311, pp. 290–301 (September 1961).

Bode et al. Berichte, vol. 75, pp. 215–21 (1942).

HENRY R. JILES, Primary Examiner

H. I. MOATZ, Assistant Examiner

U.S. Cl. X.R.

252—50, 73; 260—543.2

UNITED STATES PATENT OFFICE
CERTIFICATE OF CORRECTION

Patent No. 3,467,704          Dated September 16, 1969

Inventor(s) Edward F. Moran and Donald P. Reider

It is certified that error appears in the above-identified patent and that said Letters Patent are hereby corrected as shown below:

Column 8, line 29, after "atoms," insert --perfluoroalkox having 1 to 4 carbon atoms,--. Column 9, line 24, change "9" to --5--; line 29, after "radical" (first occurrence) delete "X is an amino radical". Column 10, line 4, after "1 to 5," insert --X is an amino radical--; line 17, the formula should read $--(C_6H_5)_3P=NP(C_6H_5)_2=NP(C_6H_5)_2=NH_2Cl--$.

SIGNED AND
SEALED
MAY 12 1970

(SEAL)
Attest:

Edward M. Fletcher, Jr.
Attesting Officer

WILLIAM E. SCHUYLER, JR.
Commissioner of Patents